United States Patent [19]

Hoenig et al.

[11] Patent Number: 4,532,187
[45] Date of Patent: Jul. 30, 1985

[54] POLYOLEFIN RESIN BLENDS WITH ENHANCED ADHESION AND LAMINATES

[75] Inventors: Stephen M. Hoenig, Angleton; David P. Flores, Lake Jackson, both of Tex.; Sally P. Ginter, Sanford, Mich.

[73] Assignee: The Dow Chemical Company, Midland, Mich.

[21] Appl. No.: 650,589

[22] Filed: Sep. 14, 1984

Related U.S. Application Data

[60] Continuation of Ser. No. 610,207, May 14, 1984, abandoned, which is a division of Ser. No. 392,969, Jun. 28, 1982, Pat. No. 4,474,928.

[51] Int. Cl.³ .................... B32B 15/08; B32B 27/06; B32B 27/08

[52] U.S. Cl. .................... 428/457; 428/461; 428/480; 428/483; 525/186

[58] Field of Search .................. 525/186; 428/457, 461

[56] References Cited

U.S. PATENT DOCUMENTS 3,470,267  9/1969  Litt et al. ............................ 525/186
3,483,141 12/1969  Litt et al. ............................ 528/402
3,640,909  2/1972  Jones et al. ......................... 525/226

Primary Examiner—Carman J. Seccuro

[57] ABSTRACT

Adhesion of polylefin resins to various substrates is enhanced by the incorporation of a poly-2-oxazoline, e.g., poly(2-ethyl-2-oxazoline) into the polyolefin.

11 Claims, No Drawings

POLYOLEFIN RESIN BLENDS WITH ENHANCED ADHESION AND LAMINATES

This Application is a continuation of copending U.S. patent application Ser. No. 610,207, filed May 14, 1984, now abandoned, which was a divisional of allowed U.S. patent application Ser. No. 392,969, filed June 28, 1982, now U.S. Pat. No. 4,474,928.

BACKGROUND OF THE INVENTION

Because of their toughness and hydrophobic nature, polyolefin resins, such as polyethylene homopolymers and copolymers, are employed in a variety of multilayer film systems and laminations. Nylon, for example, having good oxygen barrier properties, is laminated to a low density polyethylene homopolymer creating a water/oxygen barrier multilayer film system used in food packaging operations. Similarly, aluminum is laminated to low density polyethylene homopolymers to create a flexible metallic film with water/oxygen barrier properties suitable for flexible packaging.

In these laminates, the polyolefin resin is usually adhered to the other layer or substrate through use of an intermediate glue layer. While these glue layer systems initially provide adequate adhesion, they are often severely water sensitive, delaminating quickly if utilized in a water or moisture-containing environment. To ensure long-term, adequate adhesion requires additional processing of the laminate invariably causing increase in cost of the resultant composite system.

It would be desirable then to find a material which could be added to the polyolefin resin which increases the resin's adhesion to various substrates, thus reducing or eliminating the need for an intermediate glue layer and/or costly processing of the laminate to promote adhesion.

SUMMARY OF THE INVENTION

The present invention is based upon the discovery that the incorporation of a poly-2-oxazoline, as hereinafter defined, into a polyolefin resin enhances the adhesion of the polyolefin resin to a substrate.

As one embodiment, the present invention is a resin blend comprising a polyolefin and an effective amount of a polyoxazoline, whereby the adhesion of the polyolefin to another material is increased. Generally, the resin blend comprises from about 60 to about 99 weight percent of a polyolefin and from about 1 to about 40 weight percent of a poly-2-oxazoline. Preferably, the polyolefin is present in an amount of from about 80 to about 98 weight percent (90 to 98 percent most preferred) and the poly-2-oxazoline is present in an amount from about 2 to about 20 weight percent (2 to 10 percent most preferred). Advantageously, the resin blend is in the form of a film, although the resin can be used as such, e.g., hot melt adhesive or solvent based adhesive.

Another aspect of the present invention is a laminate of at least two dissimilar layers, wherein one layer is a resin blend comprising from about 60 to about 99 weight percent of a polyolefin and from about 1 to about 40 weight percent of a poly-2-oxazoline. The preferred limits for the resin blend layer are the same as for the polyolefin-poly-2-oxazoline resin blend described above. The other layer of the laminate comprises metals, such as aluminum or steel, polymers other than the specified blend and other solid substrate.

Still another aspect of the present invention is a method of enhancing the adhesion of a polyolefin resin to a substrate which comprises incorporating into the polyolefin resin an effective amount of a poly-2-oxazoline prior to contact of the resin to the substrate.

The poly-2-oxazoline not only enhances the adhesion of the polyolefin resin to substrates which the polyolefin resin is normally adherent to, but also promotes adhesion to substrates which the polyolefin resin would not otherwise have adherence, e.g., aluminum and other metallics for low density polyethylene. Moreover, the poly-2-oxazoline may also beneficially affect other physical properties of the base polyolefin resin, e.g., environmental stress crack resistance.

DETAILED DESCRIPTION OF THE INVENTION

The poly-2-oxazoline compounds used herein are compounds consisting of n randomly-joined units (I, II) and are readily prepared by the ring-opening polymerization of 2-oxazolines or like compounds (III).

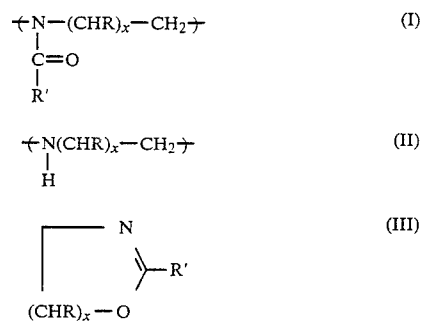

The substituents and subscripts are hereinafter defined. The ring-opening polymerization of 2-oxazoline monomers is generally conducted in the presence of a cationic polymerization catalyst at a reaction temperature of about 0° C.–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates and other like catalysts. This ring-opening polymerization is further described by Tomalia et al., J. Polymer Science, 4, 2253 (1966); Bassiri et al., Polymer Letters, 5, 871 (1967); Seeliger, Ger. 1,206,585; Jones and Roth, U.S. Pat. No. 3,640,909; and Litt et al., U.S. Pat. No. 3,483,141.

The pre-hydrolyzed polymer thereby obtained are linear, N-acylated polyethyleneimines or polypropyleneimines having a molecular structure consisting essentially of repeating units (I). These polymers can be used as such or the partially hydrolyzed form. These polymers are easily hydrolyzed (deacylated) by contact with a strong acid, such as HCl, followed by contact with a base, such as NaOH. The partially hydrolyzed polyoxazolines, have a molecular structure consisting essentially of the randomly-joined units (I) and (II), illustratively depicted as:

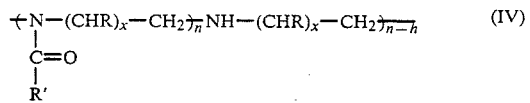

wherein: n is the total number of units or degree of polymerization; h is the number of acylated units; and n-h is the number of hydrolyzed units. In the present invention, n-h is within the range of from zero to about 50 percent of n. In the above formulae, R is typically hydrogen or $C_1$–$C_3$ alkyl; R' is typically hydrogen, phenyl or alkyl having up to about 18 carbon atoms or an inertly-substituted derivative thereof; and x is 1 or 2. As used herein, "2-oxazoline" includes both poly-2-oxazoline monomers, i.e., x is 1, and 2-oxazine monomers, i.e., x is 2, and "poly-2-oxazoline" includes both poly-2-oxazoline polymers and poly-2-oxazine polymers. By such terms as "inertly-substituted" is meant that the substituents do not preclude the polymerization of the 2-oxazoline monomers. Illustrative inert substituents include halogen, alkenyl hydrocarbons, alkoxy, ester, etc. Exemplary R substituents include hydrogen, methyl, ethyl and propyl and exemplary R' substituents include hydrogen, methyl, ethyl, propyl, pentyl, cyclohexyl, dodecyl, octadecyl, and the various halogenated, ethylenically unsaturated, etc., derivatives of each such as poly(2-trichloromethyl-2-oxazoline), poly(2-isopropenyl-2-oxazoline), etc.

Typically, the poly-2-oxazoline has a molecular weight within the range of 1,000 to 1,000,000. In the present invention, it is preferable to use a poly-2-oxazoline having a molecular weight within the range of about 100,000 to about 600,000.

The poly-2-oxazoline added to the polyolefins as described herein refers to a single species or mixtures thereof. Preferably, the polyoxazoline is poly(2-ethyl-2-oxazoline) and partially hydrolyzed poly(2-ethyl-2-oxazoline).

The poly-2-oxazoline is incorporated into the polyolefin resin by any known blending technique such as conventional melt blending equipment, including compounding extruders, Banbury mixers, roll mills and the like.

The term "polyolefin" or "polyolefin resin" as used herein refers to olefin homopolymers such as low density polyethylene made using a free radical catalyst, high density polyethylene, and polypropylene; olefin copolymers such as ethylene copolymers or propylene copolymers, e.g., copolymers of ethylene and higher alkenes, which are the so-called linear low density polyethylenes made using a coordination catalyst; copolymers of ethylene and alpha, beta-ethylenically unsaturated carboxylic acids, for example, ethylene-acrylic acid copolymers, and partial salts thereof (so-called ionomer resins), and other olefin interpolymers wherein the olefin is the major component.

Preferably, the polyolefin resin is a polyethylene homopolymer, polypropylene homopolymer and ethylene copolymers.

The "effective amount" of poly-2-oxazoline incorporated into the polyolefin resin is obtained when there is a detectable difference in bond strength between the polyolefin resin without the poly-2-oxazoline and the polyolefin resin with the poly-2-oxazoline with respect to the same substrate material. For optimum benefit of the addition of the poly-2-oxazoline, it may be desirable to "match" the particular poly-2-oxazoline with the particular polyolefin. This match is achieved by choosing a poly-2-oxazoline and polyolefin having similar rheological properties, such as viscosity and molecular weight distributions.

The resultant blend of poly-2-oxazoline and polyolefin resin can be used as such as an adhesive or component of an adhesive composition or can be blown or cast into a film, injection molded, extrusion coated, or utilized with any other conventional thermoplastic fabrication technique.

The formation of a film and laminate structures as described in the present application are well known to those skilled in the art. Substrates or other laminate layers include metals such as aluminum, ferrous metals and magnesium and non-metallics such as ceramics, e.g., glass and polymers, e.g., polyamides, polyesters, and vinylidene chloride copolymers. Beneficially, the poly-2-oxazoline can be blended into the substrate/laminate layer as well as the polyolefin layer.

EXAMPLES

In the examples, the following general procedure was employed. The poly-2-oxazoline in particulate form was dry-blended with particulate polyolefin resin at room temperature until uniform admixture was achieved. The dry-blend was then melt blended in a compounding extruder at a temperature of 350° F. The resultant pelletized product was dried, placed into the metal frame (sandwich by Mylar polymer film), and placed into the hydraulic press at 350° F. for five minutes with no pressure. The pressure was then increased to 500 psi for 1 minute. The system was then removed from the hot section of the press and placed in the cooling section for five minutes at 5000 psi, then removed.

A sample substrate was placed on the resulting "plaque", completely covering said plaque, except for a ¾ inch strip of Mylar polymer along one side and between the plaque and substrate (for tabs). This assembly was again placed in the hydraulic press (350° F.) and kept there for three minutes, no pressure. The pressure was then put at 5000 psi for one minute. The sample was removed and placed in the cooling section of the press for 5 minutes, 5000 psi. The resulting sample-substrate laminate was cut out of the frame, being sure that any and all cuts were made through the substrate first, then the sample. The bond strength was measured using an Instron Tensiometer, using one-inch strips of laminate and a crosshead speed of 5 inches per minute.

EXAMPLE 1

3.8 Pounds of low density polyethylene (0.923 density and a melt index of 4.0 grams/10 min.—ASTM D-1238, Condition E) were dry-blended with 0.2 pounds of poly(2-ethyl-2-oxazoline) (200,000 molecular weight). The mixture was then melt blend laminated as described above. A similar laminate was prepared using the low density polyethylene homopolymer without any poly-2-oxazoline addition (Comparative Example A).

The bond strength of Example 1 was determined to be 3.5 pounds per inch width. The bond strength for Comparative Example A was less than 0.01 pounds per inch width.

EXAMPLE 2

Following the same procedure as Example 1, 5 weight percent poly(2-ethyl-2-oxazoline) was incorporated into an ethylene-acrylic acid copolymer resin (0.932 density, 5.5 melt index; 6.5 weight percent acrylic acid) and formed into a laminate with an aluminum foil substrate (8 mils thick) (Example 2). A laminate was also prepared using the same aluminum foil substrate but utilizing the ethylene-acrylic acid copolymer without the poly-2-oxazoline addition (Comparative Example B).

Initial adhesion value for Example 2 was 6.75 pounds per inch width and for Comparative Example B was 6.25 pounds per inch width. Additional samples were then submerged into water at ambient temperature for 24 hours, air cooled and again tested for adhesion. Comparative Example B bond strength was reduced to 2.0 pounds per inch width, while the bond strength for Example 2 of the present invention was 5.7 pounds per inch width. This example demonstrates the unexpected retention of adhesion of the poly-2-oxazoline-containing polyolefin compositions in view of the fact that poly-2-oxazolines are water soluble.

EXAMPLES 3–6

Poly(2-ethyl-2-oxazoline) was incorporated into a number of other polyolefins and the resultant blend made into a layer of a laminate with a variety of substrates. When bond strengths of these laminates were measured and compared with bond strengths of laminates of the same materials, except without incorporation of poly(2-ethyl-2-oxazoline), the adhesion of the polyolefin was enhanced. The results are presented in Table I. A dash under the substrate column indicates no sample was tested.

TABLE I

Laminate Adhesion Values (lbs per inch width) - 350° F. Lamination Temperature

| Example | Polyolefin | Polyethyloxazoline | Cellophane | Polypropylene | Aluminum | PET |
|---|---|---|---|---|---|---|
| Comparative C | EVA | — | 0 | >24 | 2.25 | — |
| 3 | " | 5 wt % | 1 | >24 | 2.50 | — |
| Comparative D | EAA | — | 0.65 | — | 6.0 | 0.4 |
| 4 | " | 5 wt % | 0.95 | — | 6.75 | 3.5 |
| Comparative E | LLDPE | — | 0 | 3.8 | 0 | 0 |
| 5 | " | 5 wt % | 0.1 | >24 | 0.2 | 0.2 |
| Comparative F | LDPE | — | 0 | — | 0 | 0 |
| 6 | " | 5 wt % | 0.2 | — | 3.5 | 0.2 |

Notes:
Cellophane and polypropylene (oriented) film substrates - 1.25 mils thick. Aluminum foil substrate - 8 mils thick. Greater that 24 lbs/inch width values for polypropylene laminates indicates adhesive strength was greater than cohesive strength of polyolefin.
EVA: ethylene - 28 weight % vinyl acetate copolymer; 25 M.I., 0.952 density.
EAA: ethylene - 5.5 weight % acrylic acid copolymer; 6 M.I., 0.932 density.
LLDPE: ethylene - 8 weight % octene copolymer; 1 M.I., 0.920 density.
LDPE: ethylene homopolymer; 4 M.I.; 0.923 density.
PET - polyethylene terephthalate, 1.9 mils thick. Visual inspection of the bond in Examples 5 and 6 indicated spotty or bubbled adhesion.

EXAMPLES 7–10

Results similar to Examples 3–6 were achieved when laminates were made using a press temperature for the melt time and flow time of 400° F. instead of 350° F. Table II presents the results of these tests. A dash under the substrate column indicates no sample was tested.

TABLE II

Laminate Adhesion Values (lbs per inch width) - 400° F. Lamination Temperature

| Example | Polyolefin | Polyethyloxazoline | Cellophane | Polypropylene | Aluminum | PET |
|---|---|---|---|---|---|---|
| Comparative G | EVA | — | 1.75 | >24 | 2.25 | — |
| 7 | " | 5 wt % | 2.0 | >24 | 2.50 | — |
| Comparative H | EAA | — | 1.6 | 1 | 10 | 0.4 |
| 8 | " | 5 wt % | 2.5 | 1.2 | 14.5 | 7.5 |
| Comparative I | LLDPE | — | — | >24 | — | — |
| 9 | " | 5 wt % | — | >24 | — | — |
| Comparative J | LDPE | — | — | — | — | — |
| 10 | " | 5 wt % | — | — | — | — |

Notes:
Cellophane and polypropylene (oriented) film substrates - 1.25 mils thick. Aluminum foil substrate - 8 mils thick. Greater that 24 lbs/inch width values for polypropylene laminates indicates adhesive strength was greater than cohesive strength of polyolefin.
EVA: ethylene - 28 weight % vinyl acetate copolymer; 25 M.I., 0.952 density.
EAA: ethylene - 5.5 weight % acrylic acid copolymer; 6 M.I., 0.932 density.
LLDPE: ethylene - 8 weight % octene copolymer; 1 M.I., 0.920 density.
LDPE: ethylene homopolymer; 4 M.I.; 0.923 density.
PET - polyethylene terephthalate, 1.9 mils thick.

EXAMPLES 11–16

Another series of examples within the present invention was prepared in accordance with Example 2 utilizing ethylene-acrylic acid resin and several different molecular weights of polyethyloxazoline. Initial adhesion values were obtained as well as adhesion values of laminates placed in water for 36 hours at room temperature and at 150° F. Table III presents the results of these tests. These data demonstrate the retention of adhesion of the polyethyloxazoline-containing blends.

TABLE III

Laminate Adhesion Values (lbs per inch width) - 400° F. Lamination Temperature

| Example | Polyolefin | Polyethyloxazoline - 5 wt % | Initially | After 36 Hours in Water at Ambient Temperature | After 36 Hours Water at 150° F. |
|---|---|---|---|---|---|
| Comparative K | EAA* | — | 10.2 | 8.2 | 7.8 |
| 11 | " | 50,000 MW | 12.1 | 9.2 | 10 |
| 12 | " | 200,000 MW | 8.9 | 8.8 | 9.7 |
| 13 | " | 550,000 MW | 9.3 | 9.4 | 11 |
| Comparative L | EAA** | — | 9 | 10.5 | 9.8 |
| 14 | " | 50,000 MW | 11 | 11.3 | 11.5 |
| 15 | " | 200,000 MW | 11.2 | 9.2 | 9.8 |
| 16 | " | 550,000 MW | 11.5 | 11 | 11.8 |

*EAA: Ethylene - 6.5 weight percent acrylic acid copolymer; 5.5 M.I.
**EAA: Ethylene - 6.5 weight percent acrylic acid copolymer; 9 M.I.

EXAMPLES 17-22

Samples of ethylene-acylic acid copolymer (5.5 melt index; 6.5 weight percent acylic acid) were dry blended with varying amounts of poly(2-ethyl-2-oxazoline) (200,000 $\overline{M}_w$). Each dry blend was then melt blended in a Warner-Pflieder twin screw co-rotating compounding extruder, 26/1 length to diameter ratio, at a temperature of about 350° F. The pelletized product was molded into plaques in accordance with ASTM procedure D-1928. Samples taken from the plaques were tested for environmental stress crack resistance (ESCR) in water (1/2% Igepal) in accordance with ASTM procedure D-1693. The resulting data is given in Table IV.

TABLE IV

| Example | Weight Percent Poly-2-oxazoline | ESCR (Hrs before 5 out of 10 samples split) |
|---|---|---|
| Comparative M | — | 23 |
| 17 | 1 | 33 |
| 18 | 2 | 33 |
| 19 | 3 | >168 |
| 20 | 4 | >168 |
| 21 | 5 | >168 |
| 22 | 10 | >168 |

The above data demonstrates that the addition of poly-2-oxazoline to polyolefins can have a beneficial effect on other physical properties, e.g., stress crack resistance, in addition to adhesion promotion. The substantial increase in ESCR is unexpected in view of poly-2-oxazoline's known water sensitivity.

What is claimed is:

1. A laminate of at least two dissimilar layers wherein one layer is a resin blend comprising a polyolefin and an effective amount of a poly-2-oxazoline such that there is a detectable difference in bond strength between a resin blend without the poly-2-oxazoline and the resin blend with the poly-2-oxazoline with respect to the same substrate material.

2. The laminate of claim 1 wherein the polyolefin-poly-2-oxazoline resin blend comprises from about 60 to 99 weight percent of the polyolefin and from about 1 to 40 weight percent of the poly-2-oxazoline.

3. The laminate of claim 1 wherein the other layer is metal.

4. The laminate of claim 3 wherein the metal is aluminum.

5. The laminate of claim 1 wherein the other layer is a polymer.

6. The laminate of claim 5 wherein the polymer is polypropylene.

7. The laminate of claim 5 wherein the polymer is polyethylene terephthalate.

8. The laminate of claim 1 wherein said polyolefin is an ethylene copolymer.

9. The laminate of claim 8 wherein said ethylene copolymer is ethylene-acrylic acid.

10. The laminate of claim 1 wherein said polyolefin is a homopolymer of ethylene.

11. The laminate of claim 10 wherein said homopolymer of ethylene is low density polyethylene or linear low density polyethylene.

* * * * *